United States Patent
Chen et al.

(10) Patent No.: US 6,963,785 B2
(45) Date of Patent: Nov. 8, 2005

(54) METHOD FOR TARGET QUEUE TIME CALCULATION IN SEMICONDUCTOR MANUFACTURING PLANNING

(75) Inventors: Ju-Kau Chen, Changhua (TW); Chao-Fan Chang, Hsin-Chu (TW); Wen-Pin Wu, Miaoli (TW); Gwo-Chiang Fang, Pingjhen (TW); Ming-Feng Ou, Hsinchu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 136 days.

(21) Appl. No.: 10/733,057

(22) Filed: Dec. 11, 2003

(65) Prior Publication Data

US 2005/0131564 A1   Jun. 16, 2005

(51) Int. Cl.$^7$ ............................................. G06F 19/00
(52) U.S. Cl. .......................... 700/100; 710/6; 718/102; 700/121
(58) Field of Search ............................... 700/102, 121, 700/174; 710/6; 715/962; 718/102, 103, 718/106; 713/502

(56) References Cited

U.S. PATENT DOCUMENTS

| | | | |
|---|---|---|---|
| 4,796,194 A | | 1/1989 | Atherton |
| 5,465,354 A | * | 11/1995 | Hirosawa et al. ............ 718/106 |
| 5,612,886 A | * | 3/1997 | Weng .......................... 700/101 |
| 5,694,325 A | * | 12/1997 | Fukuda et al. ............... 700/121 |
| 5,826,040 A | | 10/1998 | Fargher et al. |

* cited by examiner

*Primary Examiner*—Leo Picard
*Assistant Examiner*—Sheela S. Rao
(74) *Attorney, Agent, or Firm*—Haynes and Boone, LLP

(57) ABSTRACT

A method is provided for product culmination estimation in a microelectronics manufacturing environment. The method includes providing a manufacturing executing system including a plurality of processing entities. The manufacturing executing system provides interconnectivity and management of the processing entities. The method also assigns a standard queue time factor to product advancing through the manufacturing executing system, and determines an actual and theoretical cycle time and associated with the product through each process entity of the manufacturing executing system. The method further includes anticipating a target queue time for the product through the manufacturing executing system, and forecasting product cycle time of the product through the manufacturing executing system.

40 Claims, 2 Drawing Sheets

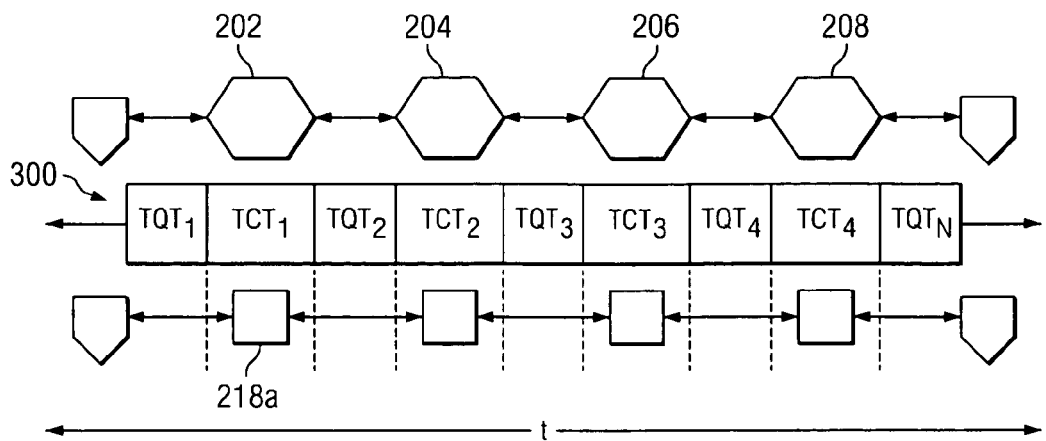
Fig. 3
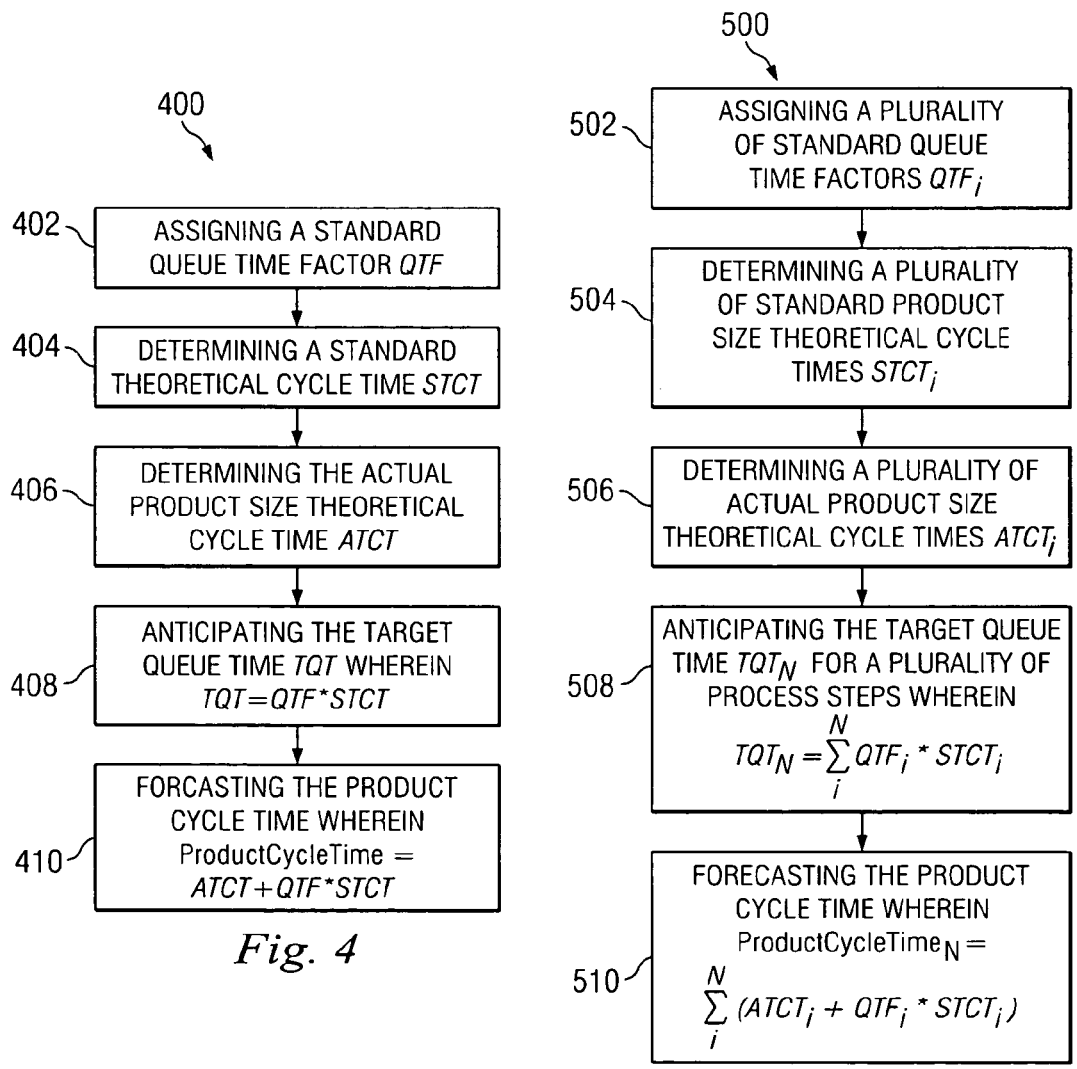
Fig. 4
Fig. 5

METHOD FOR TARGET QUEUE TIME CALCULATION IN SEMICONDUCTOR MANUFACTURING PLANNING

BACKGROUND

The present disclosure relates generally to product flow management in a semiconductor fabrication facility, and, more specifically, to a system and method for product culmination estimation utilizing a promulgated standard queue time factor.

During fabrication, one or more semiconductor devices are typically arranged on a substrate such as a wafer, and wafers are formed into groups, or "lots." The fabrication of complex semiconductor devices utilizes many process steps where the total fabrication of a plurality of complex semiconductor devices may take up to several months. The time employed between processes and the time for a process may vary according to a vast number of parameters. The waiting time between processes for a product may generally be referred to as the queue time. Each process may be a batch process, where a group of semiconductor devices (e.g., one or more wafer lots) are processed at the same time, or a serial process, where devices or wafers are individually processed. Furthermore, the product may be clustered together and may be transported to each process as a group. Product may be fabricated upon a substrate that may include a single product or a plurality of different products upon the substrate. The product substrates may be grouped together into a lot, wherein the size of the lot may vary or may be a standard number of substrates or products. The time to process a lot of wafers or other substrates may generally be referred to as the process or cycle time.

Process times and queue times are very important for several reasons. For example, reliability, performance and product yield can be affected by these times. Also, it is generally desirable to understand and predict the flow of wafers through the fabrication facility (fab). The monitoring and forecasting of product movement through a fab is hereinafter referred to as "product culmination forecasting". Accordingly, what is needed is a system and method of improved product culmination forecasting.

BRIEF DESCRIPTION OF THE DRAWINGS

Aspects of the present disclosure are best understood from the following detailed description when read with the accompanying figures.

FIG. 3 illustrates a flow chart view of one embodiment of the product culmination estimation method constructed according to aspects of the present disclosure.

FIG. 4 illustrates a flow chart view of the embodiment of the product culmination estimation method constructed according to aspects of the present disclosure.

FIG. 5 illustrates a flow chart view of another embodiment product culmination estimation method constructed according to aspects of the present disclosure.

DETAILED DESCRIPTION

Figure 1:
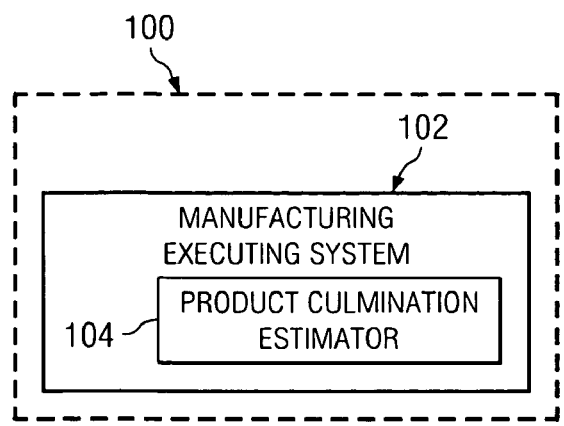
FIG. 1 illustrates a block schematic view of one embodiment of a system constructed according to aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the communication of a first entity to a second entity in the description that follows may include embodiments in which the first and second entity are directly linked, and may also include embodiments in which additional entities may be interposing the link of the first and second entities, such that the first and second entities may not be in a direct link.

Referring to FIG. 1, a system 100 is one example of a system for implementing one or more embodiments of the present disclosure. The system 100 comprises at least two components. The first component is a manufacturing executing system 102 which includes processing equipment, product transportation equipment, automation systems, a computer network, an administrative system, and additional interfaces. The manufacturing executing system 102 may also include a "virtual fab," which allows the administrative system to monitor and control the processing equipment, product transportation equipment, and/or the automation systems via one or more wired or wireless networks. Wireless systems which may interact with the virtual fab include personal data devices (PDAs), cell phones, computers, and other interfaces. Examples of a virtual fab are disclosed in U.S. patent Ser. No. 10/613,139 filed Jul. 1, 2003, which is hereby incorporated by reference.

The second component of the system 100 is a product culmination estimator 104. The product culmination estimator 104 may operate through the manufacturing executing system 102, such as through the above-mentioned virtual fab. The product culmination estimator 104 includes hardware, software, and memory for executing a plurality of methods for determining the product queue time and process cycle time, as well as forecasting product culmination. The product culmination estimator 104 may interact with the manufacturing executing system 102 to access data for a plurality of process entities to extract cycle time and queue time data. The product culmination estimator 104 may process data retrieved by the manufacturing executing system 102. The data may comprise a plurality of times "in" and times "out" of a process step (process time), and the time between process steps (queue time).

Figure 2:
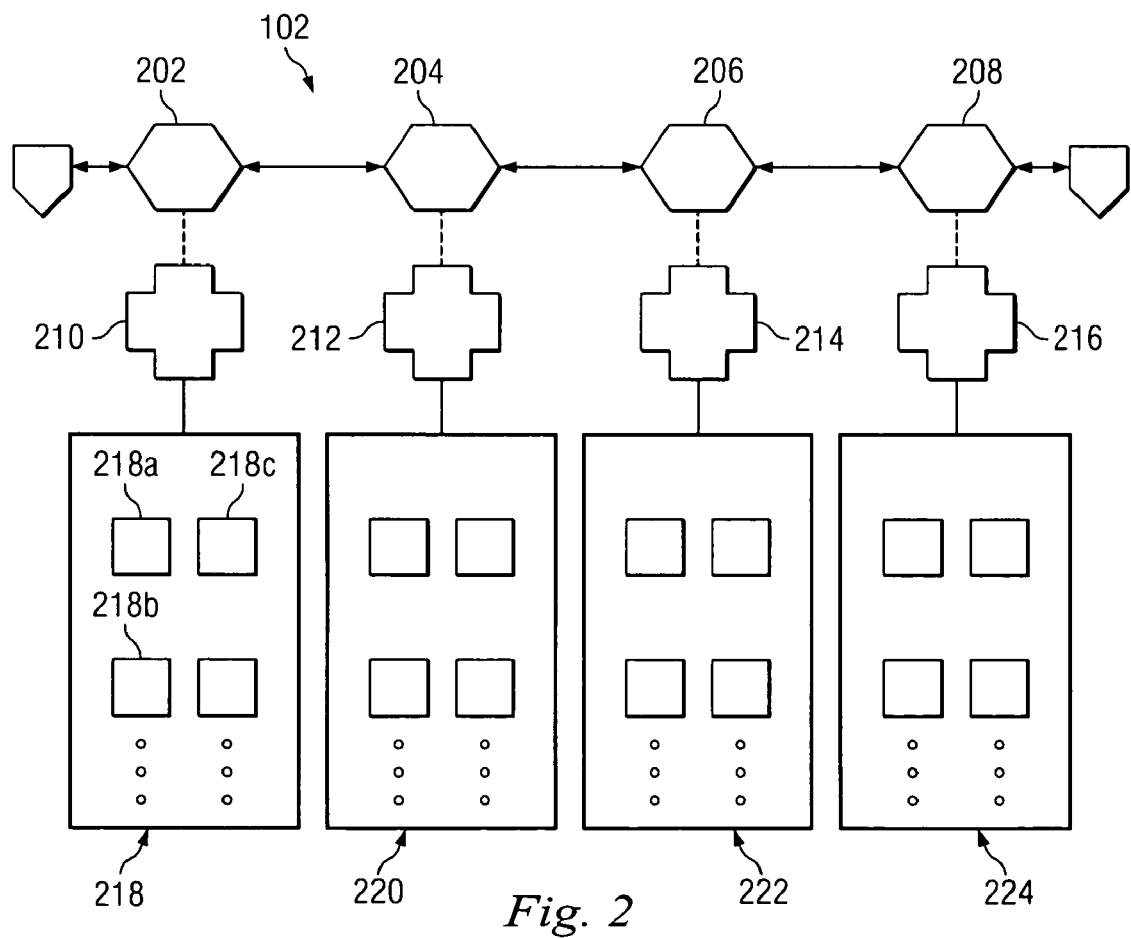
FIG. 2 illustrates a block diagram view of another embodiment of a manufacturing executing system constructed according to aspects of the present disclosure.

Referring to FIG. 2, the manufacturing executing system 102 includes a plurality of product route operations or "log points" 202–208, wherein each product route operation may include one or more process tools 210–216, respectively. Each process tool 210–216 may include one or more process events 218–224, respectively. For example, a thin films process operation 202 may utilize a cluster tool 210. The cluster tool 210 is used with a process event 218a, e.g. refractory metal deposition process, a second process event 218b, e.g., a bulk metal deposition process, and a third process event 218c, e.g., forming a barrier layer. The materials fabricated upon a substrate may cover features with geometries ranging between about 180 nm and about 0.5 nm. The process events 218a–c may utilize a common system, such as a plasma furnace, or different systems such as those used for physical vapor deposition (PVD), atomic layer deposition (ALD), chemical vapor deposition (CVD), or plasma enhanced chemical vapor deposition (PECVD).

Referring to FIG. 3, a flow diagram 300 can be used with one embodiment of the product culmination estimation method 104 (FIG. 1). For the sake of continued example, the flow diagram 300 refers to the product route operations 202–208 of FIG. 2. The product route operations 202–208 may represent a plurality of events and operations which may occur in a manufacturing environment 102 (FIG. 1). The flow diagram 300 illustrates one concept of cycle times and queue times in the manufacturing environment. Several theoretical cycle times (TCT) are represented in flow diagram 300 as $TCT_1$, $TCT_2$, $TCT_3$, and $TCT_4$, corresponding to product route operations 202–208, respectively. To simplify the following discussion, it will be assumed that each product route operation 202–208 has a single process event (e.g., process event 218a for product route operation 202), and the corresponding TCT represents the time needed to complete the event. It is understood, however, that for those product route operations with multiple process events, the corresponding TCT can represent the time needed to complete all of the events. In an alternative embodiment, a single product route operation can have multiple consecutive TCTs to represent multiple process events. Each TCT may be dependent upon a plurality of parameters which may be constant or variable. The change of a TCT may be dependent upon process parameters. For example, a scheduled maintenance/calibration may be required after a predetermined number of wafers or wafer lots. Also, some processes may require extended time based upon the specific product being processed.

Several target queue times (TQT) are represented as $TQT_1$, $TQT_2$, $TQT_3$, $TQT_4$, and $TQT_N$. Each TQT represents a desired queue time between a prior product route operation and a next product route operation. The TQT may be different at each product route operation due to various factors, such as the preceding or next product route operation may be serial (single) or parallel (batch) and due to the process cycle time TCT. In the embodiments where there are multiple process events for a single product route operation, multiple TCTs and TQTs may be used, as needed. In addition, more than one TQT and/or more than one TCT can be arranged in sequence. For example, two process events can be in sequence, without any appreciable TQT there between. Also, two queue times can be in sequence with no process event there between.

Referring to FIG. 4, a method 400 can be used to implement one embodiment of the product culmination estimation method 104 (FIG. 1). The method 400 of the system 100 includes steps 402–410 for the forecasting of target queue times TQTs and product cycle times TCTs through the product route operations 202–208.

The method 400 begins at step 402, where a standard queue time factor QTF may be applied to a plurality of product. The standard QTF represents a constant value which may be specified to the individual product route operation(s) 202–208 and/or the processing event(s) in the manufacturing executing system 102. The standard QTF may differ for each product route operation 202–208 and/or processing event. In the present embodiment, the standard QTF is a numerical value corresponding to historical data (e.g., compared to similar products, similar wafer sizes, and/or similar processing flows and technologies). For example, in the case of 8 inch (200 mm) diameter wafers, the lot size may range between about 1 and about 25 wafers, and for 12 inch (300 mm) diameter substrates the lot size may range between about 1 and about 15 wafers. In another embodiment, the QTF is dependent on lot size. Also, the standard QTF may be promulgated to limited real estate areas upon a semiconductor substrate, referred to as multiple project wafers, wherein each real estate area may be associated with a different product(s) and/or different customer order(s).

At step 404, a standard theoretical cycle time STCT is determined for each product route operation 202–208 and/or processing event of the manufacturing executing system 102 (the STCT may be different for each). The STCT may correspond to the cycle time for a standardize product size or product lot size. The STCT is also based on whether processing occurs serially (single wafer) or by batch (multiple wafers), as well as other process environmental conditions. The configuration and design of the process equipment may further influence the standard STCT. The STCT may further be limited to be the same for a plurality of product route operation 202–208 and/or processing events. Alternatively, the STCT may be unique for every product route operation 202–208 and/or processing event.

After the determination of the STCT at step 404, an adjusted product size theoretical cycle time ATCT is determined at step 406. The ATCT corresponds to the theoretical cycle time for product sizes or lot sizes greater or less than the STCT product or lot size. In a manufacturing environment, there may be a plurality of product lots or groupings wherein the size may not coincide with the STCT product or lot size. For example, there may be wafer lots with as few as five wafers compared to a STCT of fifteen. The use of a smaller lot size may be a result of a child lot from a parent standard lot, a process test lot, or an engineering device test lot. The engineering test lot may be frequently utilized in a manufacturing environment for evaluating new processes and implementations. Step 406 assigns the variable ATCT for each product lot or product size that may be processed through a product route operation 202–208 and/or processing event.

At step 408, a target queue time TQT is determined by the product of the standard QTF and the standard STCT. Therefore, at each product route operation 202–208 and/or processing event, a unique TQT may be anticipated. Alternatively, a global TQT may be anticipated for a plurality of product route operation(s) 202–208 and/or processing event(s). Employing a standard QTF for each product size or lot, regardless of the product size, provides a method for estimating the culmination of a product through a manufacturing process. The standard QTF allows for consistent flow of material through a process without sacrificing process cycle time for reduced product sizes or lots, therefore forecasting of product culmination in a manufacturing system may be more readily anticipated by the system 100 of FIG. 1.

At step 410, the product cycle time may be forecasted by the summation of the ATCT and the TQT for a specified product route operation 202–208 and/or processing event.

Referring to FIG. 5, a method 500 can be used to implement another embodiment of the product culmination estimation method 104 (FIG. 1). The method 500 begins at step 502, where the application of a plurality of standard queue time factors $QTF_i$ are associated with a plurality of product route operations 202–208 and/or processing events. Each of the standard $QTF_i$ may represent a value that is maintained constant throughout the manufacturing cycle time and the queue time estimation of the manufacturing executing system 102. The standard $QTF_i$ may differ for individual product route operation(s) 202–208 and/or processing event(s). Alternatively, the standard $QTF_i$ may be globally shared for the product route operation(s) 202–208 and/or processing event(s) of the method 500 of the product culmination estimation method 104. In the present embodiment, the standard $QTF_i$ provides a numerical value corresponding to a frequently occurring $QTF_i$ of a predetermined product size. For example, the product may be grouped by lots wherein a myriad of product wafers may be transported between individual product route operation(s) 202–208 or processing event(s). Alternatively, the lot size may be arbitrary and the plurality of standard $QTF_i$ utilized by the product culmination estimation method 104 is the $QTF_i$ of the typical number of wafers incorporated into a lot. The standard $QTF_i$ may be promulgated to limited real estate areas upon a semiconductor substrate, referred to as multiple project wafers, wherein each real estate area may correspond to a different product and/or different customer order.

At step 504, a plurality of standard theoretical cycle time $TCT_i$ are determined for each product route operation 202–208 and/or processing event of the manufacturing executing system 102. The plurality of standard $TCT_i$ may correspond to the cycle time for the standardize product size or product lot size. The plurality of standard $TCT_i$ may be determined according to the process, wherein processing (e.g., serial or batch) and by the process environmental conditions. The configuration and design of the process equipment may further influence the plurality of standard $TCT_i$. The plurality of standard $TCT_i$ may further be limited to be the same for a plurality of product route operations 202–208 and/or processing events. Alternatively, the plurality of standard $TCT_i$ may be unique for every product route operations 202–208 and/or processing events.

At step 506, following the determination of the plurality of standard $TCT_i$, a plurality of actual product size theoretical cycle times $ATCT_i$ are determined. The plurality of $ATCT_i$ corresponds to the theoretical cycle time for product sizes or lot sizes greater or less than the standard $TCT_i$ product or lot size. For example, there may be wafer lots with as few as two wafers as compared to a plurality of standard $TCT_i$ of fifteen. The use of smaller lot size(s) may be a result of a child lot separated or split from a parent lot, a process test lot, and/or an engineering device test lot. The variable $ATCT_i$ are assigned for each product lot or product size that may be processed through a product route operation 202–208 and/or processing event.

At step 508, a plurality of target queue times $TQT_N$ can be determined by the product of the standard $QTF_i$ and the standard $ATCT_i$. Therefore, at each product route operation 202–208 and/or processing event, a unique plurality of $TQT_N$ may be anticipated. Alternatively, a global $TQT_N$ may be anticipated for a plurality of product route operations 202–208 and/or processing events. Employing a plurality of standard $QTF_i$ for each product size or lot regardless of the product size provides a simple method for estimating the culmination of a product through a manufacturing process. The plurality of standard $QTF_i$ allows for consistent flow of material through a process without sacrificing process cycle time for reduced product sizes or lots, therefore forecasting product culmination in a manufacturing system may be more readily anticipated by the system 100 of FIG. 1. At step 510, a plurality of product cycle times are forecasted by the summation of the $ATCT_i$ and the $TCT_i$ for each product route operation 202–208 and/or processing event (or collections thereof).

Although embodiments of the present disclosure have been described in detail, those skilled in the art should understand that they may make various changes, substitutions and alterations herein without departing from the spirit and scope of the present disclosure.

What is claimed is:

1. A software program stored on a recordable medium, the software program being used for product culmination estimation in a semiconductor fabrication facility (fab), the software program comprising:
   instructions for receiving a lot size for a product to be processed by a plurality of process events;
   instructions for determining a theoretical cycle time (TCT) as a sum of processing times for the plurality of process events for the lot size;
   instructions for determining a target queue time (TQT) as a function of a standard theoretical cycle time (STCT) and a standard queue time factor (QTF) assigned to the product, independent of lot size;
   instructions for performing a product culmination estimation for the lot size of the product as a function of the TCT and the target queue time.

2. The software program of claim 1, wherein the function for product culmination estimation equals: TCT+TQT.

3. The software program of claim 1, wherein the function for determining TQT equals: QTF×STCT.

4. A method for product culmination estimation in a semiconductor manufacturing environment, comprising:
   providing a manufacturing executing system comprising a plurality of processing entities and a plurality of computing entities, the manufacturing system providing interconnectivity and management of the processing entities and the computing entities;
   assigning a standard queue time factor (QTF) to product advancing through the manufacturing executing system;
   determining an actual theoretical cycle time (ATCT) associated with the product through each process entity of the manufacturing executing system;
   anticipating a target queue time (TQT) for the product through the manufacturing executing system as a function of the ATCT and the QTF; and
   forecasting a product cycle time of the product through the manufacturing executing system as a function of the TQT.

5. The method of claim 4 wherein the QTF is specific to a process flow.

6. The method of claim 4 wherein the QTF is specific to a portion of a process flow.

7. The method of claim 4 wherein the manufacturing executing system comprises a communications network, the network further coupled to a plurality of computing entities for determining the ATCT.

8. The method of claim 7 wherein the ATCT comprises a plurality of values, one for each processing entity.

9. The method of claim 4 wherein the manufacturing executing system comprises a communications network, the network further coupled to a plurality of computing entities for determining the TQT.

10. The method of claim 9 wherein the TQT comprises a plurality of values as a function of the plurality of ATCT and QTF, one for each processing entity.

11. The method of claim 9 wherein the QTF comprises a constant value common among the plurality of processing entities.

12. The method of claim 9 wherein the QTF comprises a plurality of constant values, one for each processing entity.

13. The method of claim 4 wherein the processing entities represents a single product process.

14. The method of claim 4 wherein the TQT comprises the product of the standard queue time factors and the theoretical cycle time.

15. The method of claim 14 wherein the TQT comprises a target queue time for a plurality of product through a plurality of processing entities.

16. The method of claim 4 wherein the product cycle time comprises the summation of the target queue time and the actual cycle time.

17. The method of claim 16 wherein the product cycle time comprises a product cycle time for a plurality of product through a plurality of processing entities.

18. The method of claim 4 wherein the product includes between about one and about twenty five semiconductor substrates, wherein the substrates have a diameter between about 200 mm and about 500 mm.

19. The method of claim 4 wherein the product includes a multiple project wafer, the multiple project wafer comprising a plurality of different product.

20. The method of claim 19 wherein the multiple project wafer includes a plurality of standard queue time factors.

21. A system for product culmination estimation in a microelectronics manufacturing environment, the system comprising:
a first group of instructions for establishing a manufacturing executing system having a plurality of processing entities and a plurality of computing entities;
a second group of instructions for providing a product culmination estimator, the product culmination estimator being a function of a plurality of standard queue time factors assigned to the products in the manufacturing system, an actual and theoretical cycle time, a target queue time, and a product cycle time; and
one or more memories for storing the first or second group of instructions.

22. The system of claim 21 wherein the standard queue time factors are specific to a process flow.

23. The system of claim 21 wherein the standard queue time factors are specific to a portion of a process flow.

24. The system of claim 21 wherein the manufacturing executing system comprises a communications network, the network further coupled to a plurality of computing entities for determining the actual theoretical cycle time.

25. The system of claim 24 wherein the actual theoretical cycle time comprises a plurality of values, one for each processing entity.

26. The system of claim 21 wherein the manufacturing executing system comprises a communications network, the network further coupled to a plurality of computing entities for determining the target queue time.

27. The system of claim 26 wherein the target queue time comprises a plurality of values as a function of the plurality of actual theoretical cycle time and queue time factors, one for each processing entity.

28. The system of claim 21 wherein the manufacturing executing system comprises a communications network, the network further coupled to a plurality of computing entities for determining the product cycle time.

29. The system of claim 21 wherein the manufacturing executing system comprises a communications network, the network further coupled to a plurality of computing entities for assigning the queue time factor to the product through the manufacturing executing system.

30. The system of claim 29 wherein the queue time factor comprises a constant value common among the plurality of processing entities.

31. The system of claim 29 wherein the queue time factor comprises a plurality of constant values, one for each processing entity.

32. The system of claim 21 wherein the processing entities represents a single product process.

33. The system of claim 21 wherein at least one of the processing entities is a batch product process.

34. The system of claim 21 wherein the target queue time comprises the product of the standard queue time factors and the theoretical cycle time.

35. The system of claim 34 wherein the target queue time comprises a target queue time for a plurality of product through a plurality of processing entities.

36. The system of claim 21 wherein the product cycle time comprises the summation of the target queue time and the actual cycle time.

37. The system of claim 36 wherein the product cycle time comprises a product cycle time for a plurality of product through a plurality of processing entities.

38. The system of claim 21 wherein the product includes between about one and about twenty five semiconductor substrates, wherein the substrates have a diameter between about 200 mm and about 500 mm.

39. The system of claim 21 wherein the product includes a multiple project wafer, the multiple project wafer comprising a plurality of different product.

40. The system of claim 39 wherein the multiple project wafer includes a plurality of standard queue time factors.

* * * * *